United States Patent [19]

Matsuhashi

[11] Patent Number: 4,912,988
[45] Date of Patent: Apr. 3, 1990

[54] TOUCH SENSOR

[75] Inventor: Akira Matsuhashi, Koganei, Japan

[73] Assignee: Metrol Co., Ltd., Tokyo, Japan

[21] Appl. No.: 215,130

[22] Filed: Jul. 5, 1988

[30] Foreign Application Priority Data

Apr. 14, 1988 [JP] Japan .................. 62-95527

[51] Int. Cl.$^4$ .............................................. G01B 7/00
[52] U.S. Cl. .................................................. 73/865.8
[58] Field of Search ................... 73/865.8, 866.5, 104;
33/549, 552, 556–561, 572, 202

[56] References Cited

U.S. PATENT DOCUMENTS

| 2,899,653 | 8/1959 | Copron | 336/30 |
|---|---|---|---|
| 3,229,587 | 1/1966 | Chauvel | 90/62 |
| 3,307,267 | 3/1967 | Barr et al. | 33/556 |
| 4,339,714 | 7/1982 | Ellis | 33/559 |
| 4,488,019 | 12/1984 | Sakata | 200/61.42 |
| 4,547,971 | 10/1985 | Imazeki | 33/169 R |
| 4,561,190 | 12/1985 | Yamamoto et al. | 33/561 |
| 4,699,551 | 10/1987 | Peris | 33/560 |

FOREIGN PATENT DOCUMENTS

| 0159781 | 10/1985 | European Pat. Off. | 33/559 |
|---|---|---|---|
| 2725966 | 12/1977 | Fed. Rep. of Germany . | |
| 61-167510 | 10/1986 | Japan . | |
| 0206120 | 12/1967 | U.S.S.R. | 33/559 |
| 2139357A | 10/1983 | United Kingdom . | |

OTHER PUBLICATIONS

Japanese Patent Abstract No. 61-223509 dated Oct. 4, 1986.

Primary Examiner—Robert R. Raevis
Attorney, Agent, or Firm—Armstrong, Nikaido, Marmelstein, Kubovcik & Murray

[57] ABSTRACT

A touch sensor comprises a probe disposed on a rotatable shaft projecting from one side of a housing and adapted to rotate the shaft when an object to be detected is brought into contact therewith as well as a contact disposed in the housing and adapted to issue a trigger signal as it is turned on or off by the rotation of the shaft.

4 Claims, 5 Drawing Sheets

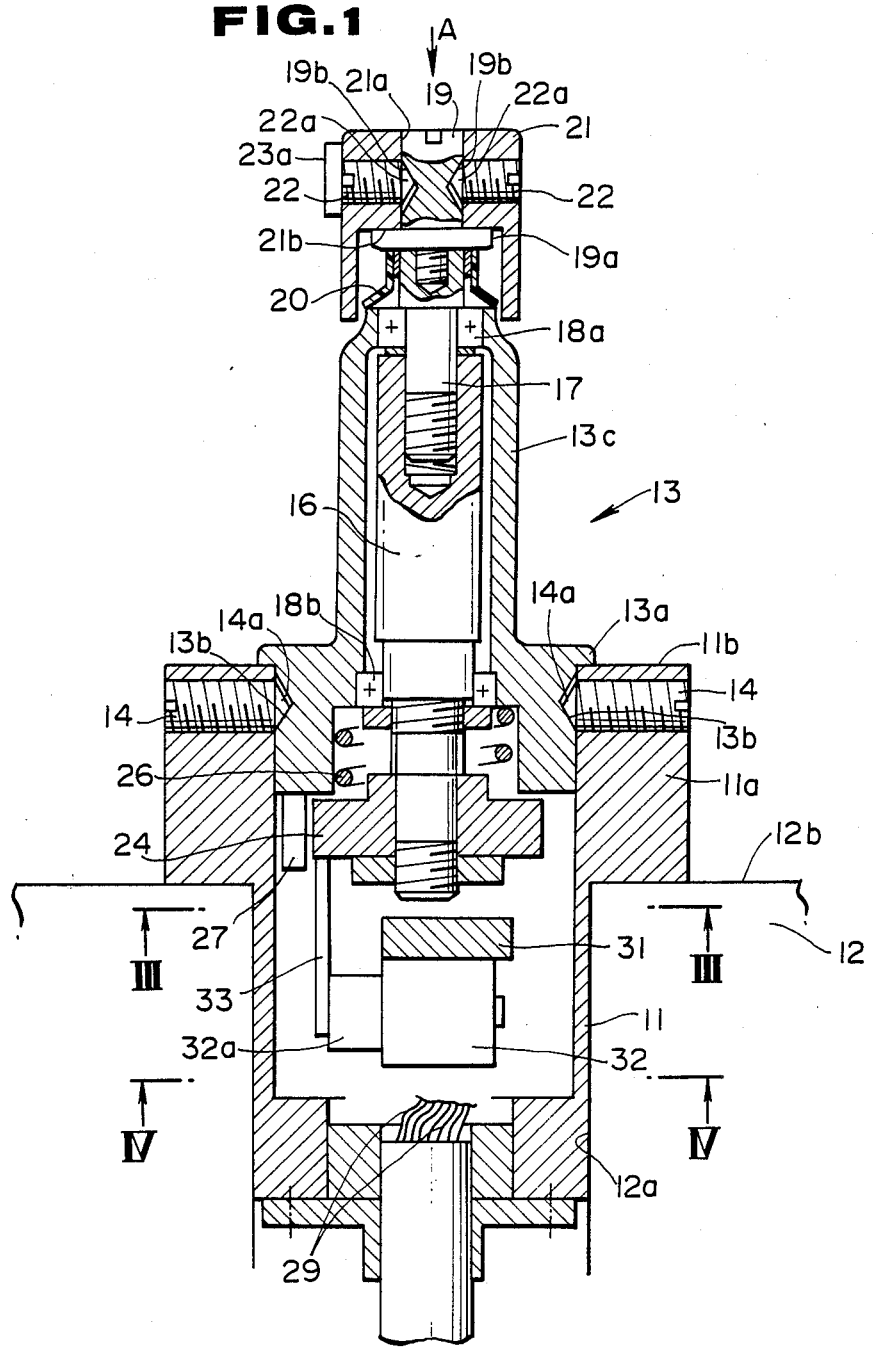

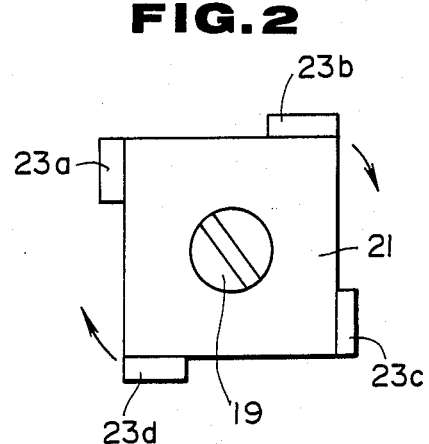
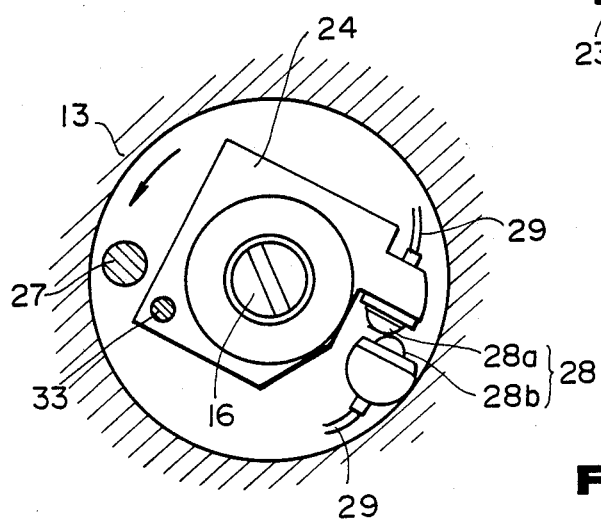
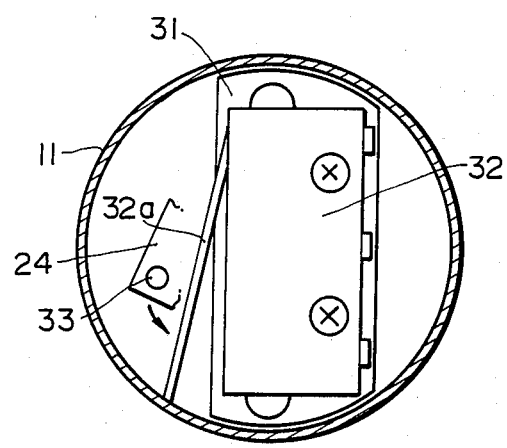

TOUCH SENSOR

BACKGROUND OF THE INVENTION

1. Field of the Invention

The present invention relates to a touch sensor for measuring the position of an object to be detected, such as a cutting tool used in an NC lathe or the like.

2. Related Art Statement

As is well known, for instance, an NC lathe, a manufacturing line, or the like is generally provided with a plurality of touch sensors respectively having projections in a plurality of directions in correspondence with the directions of movement of objects to be detected such as cutting tools, members or the like in order to detect the positions of the objects to be detected.

A conventional technique concerning this touch sensor will be described with reference to FIGS. 9 and 10. Plungers 3a, 3b, 3c, 3d are provided at one end of a column 2 detachably secured to, for instance, a bed of a lathe via a fixing member 1 in such a manner as to be disposed perpendicularly of the column 2 and project in four directions. Contacts 4a, 4b, 4c, 4d formed of a carbide tool material are respectively fitted to the centers of the tips of the plungers 3a–3d. In addition, the end surfaces of the contacts 4a to 4d which are more remote from the shaft 2 are formed to a high level of precision.

This touch sensor is disposed in the vicinity of, for instance, a chuck of a lathe. If an object to be detected such as a cutting tool, is brought into contact with any of the contacts 4a to 4d, a trigger signal is to be output from the touch sensor.

With this conventional technique, however, since the contacts 4a to 4d are respectively fitted to the tip portions of the plungers 3a to 3d, the distance between the respective opposing ones of the contacts 3a to 3d, i.e., the dimension A shown in FIGS. 9 and 10, becomes large.

For this reason, when the position of a cutting tool or a member is detected, it is necessary to enlarge the distance between the object to be detected and the contacts. If the distance between, for instance, the cutting tools to be detected is small, there is the possibility that it becomes impossible to effect detection due to the large dimension A, and the setup of an operation is disadvantageously restricted as a result.

In addition, since it is necessary to cause the plungers to project from the column and to install the contacts to the respective tips thereof, production costs are liable to increase.

OBJECT AND SUMMARY OF THE INVENTION

Accordingly, it is an object of the present invention to provide a touch sensor which is capable of realizing the economic efficiency with a compact and simple arrangement, thereby overcoming the above-described drawbacks of the prior art.

To this end, according to the present invention, there is provided a touch sensor comprising: a housing; a rotatable shaft projecting from one side of the housing; at least one probe provided on the shaft and adapted to rotate the shaft when an object to be detected is brought into contact therewith; and a contact disposed in the housing and adapted to issue a trigger signal as the contact is turned on or off by the rotation of the shaft.

The above and other features and advantages of the present invention will become more apparent from the following description of the invention when read in conjunction with the accompanying drawings.

BRIEF DESCRIPTION OF THE DRAWINGS;

FIGS. 1 to 4 relate to a first embodiment of the present invention, in which

FIG. 1 is a side elevational view of a touch sensor;

FIG. 2 is a view taken in the direction of the arrow A of FIG. 1;

FIG. 3 is a view taken along the line III—III of FIG. 1 in the direction of the arrows;

FIG. 4 is a view taken along the line IV—IV of FIG. 1 in the direction of the arrows;

FIGS. 5 to 8 relate to a second embodiment of the present invention, in which

FIG. 5 is a side cross-sectional view illustrating essential portions of the touch sensor;

FIG. 6 is a view taken along the line VI—VI of FIG. 5 in the direction of the arrows;

FIG. 7 is a view taken along the line VII—VII of FIG. 5 in the direction of the arrows;

FIG. 8 is a view taken along the line B of FIG. 6 in the direction of the arrow;

FIGS. 9 and 10 relate to a conventional technique, in which

FIG. 9 is a top plan view of the touch sensor; and

FIG. 10 is a side elevational view thereof.

DETAILED DESCRIPTION OF THE PREFERRED EMBODIMENTS

Figure 5:
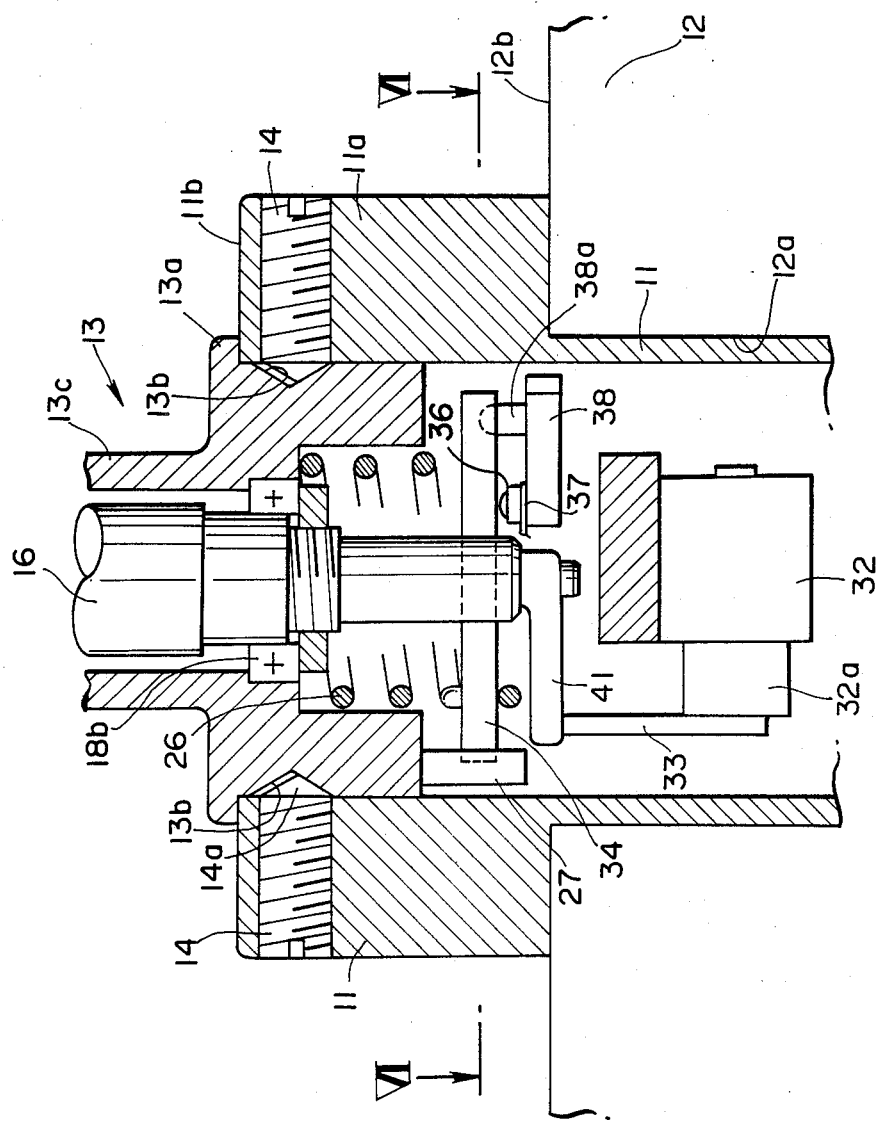
Figure 6:
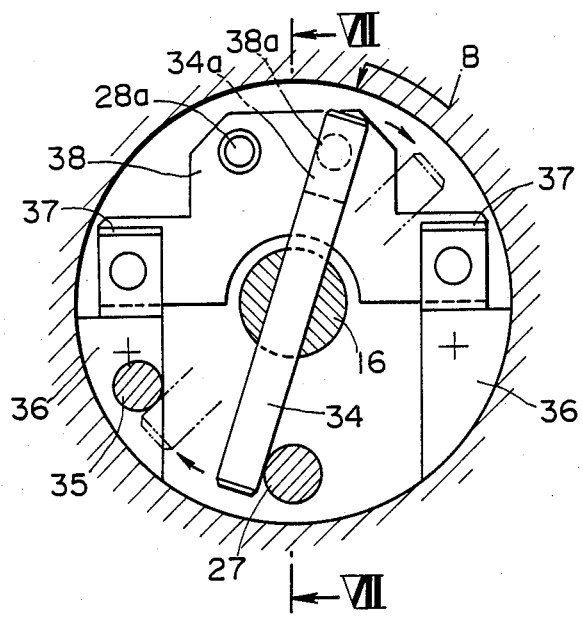
Figure 7:
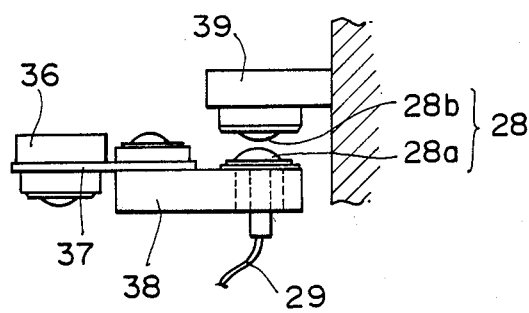

FIGS. 1 to 4 illustrate a first embodiment of the present invention.

In these drawings, reference numeral 11 denotes a housing which is formed into a substantially cylindrical shape and on one side of which a flange 11a is provided. This housing 11 is inserted into an opening 12a of a fixing member 12 which is installed on, for instance, a bed of a lathe, and is secured as the flange 11a is retained at an upper surface 12b of this fixing member 12.

In addition, an upper side of the housing 11 which is provided with the flange 11a is open, and a holder 13 is detachably secured at a portion of this opening.

In other words, a flange 13a is formed midway in the holder 13 and is retained at an upper surface 11b of the flange of the housing 11. Fixing bolts 14 are screwed into the flange 11a of the housing 11 from the outside of the flange 11a. A tip portion 14a of each of the fixing bolts 14 is formed into a sharply pointed shape. The holder 13 is secured even more firmly as this tip portion 14a is engaged with an engaging portion 13b provided at a position at which the tip portion 14a is inserted in the housing 11 of the holder 13.

An upwardly projecting cylindrical portion 13c is formed at a central portion of the holder 13, and a shaft 16 is accommodated in this cylindrical portion 13c. A second shaft 17 is screwed into an upper end of this shaft 16, and the second shaft 17 and the shaft 16 are rotatably supported by the cylindrical portion 13c via bearings 18a, 18b. In addition, a dust-proof cover 20, which is formed of, for instance, a flexible material, is provided between this second shaft 17 and the cylindrical portion 13c so as to prevent dust from entering the holder 13.

One end of the second shaft 17 projects more upwardly than the cylindrical portion 13c of the holder 13, and a third shaft 19 is screwed into this projecting end portion. The axes of the second and third shafts 17, 19 are aligned with the axis of the shaft 16.

A rotary member 21 whose top plane is formed into a square shape is provided on an upper portion of the third shaft 19. Namely, an opening 21a is formed in a central portion of this rotary member 21, and an upper portion of the third shaft 19 is inserted into this opening 21a. In addition, a flange 19a is formed on this third shaft 19 on the side of the second shaft 17, and a lower end surface 21b of the rotary member 21 abuts against this flange 19a.

Furthermore, fixing bolts 22 are screwed into the rotary member 21 from the outside of the rotary member 21. A tip portion 22a of each of these fixing bolts 22 which is formed into a sharply pointed shape is exposed in the opening 21a, and is engaged with an engaging portion 19b formed in the third shaft 19.

As shown in FIG. 2, probes 23a, 23b, 23c, 23d, with which an object to be detected such as a cutting tool, a member or the like is brought into contact, are formed at terminating portions of the respective sides of the rotary member 21 which constitute the square shape. These probes 23a to 23d are spaced apart from the axis of the third shaft 19 by predetermined distances. When the object to be detected is brought into contact with any of the probes 23a to 23d, the rotary member 21 is adapted to rotate about the third shaft 19 in the direction of the terminating end portions of the sides of the rotary member 21 at which the probes 23a to 23d are provided, i.e., in the direction of the arrows shown in FIG. 2.

Meanwhile, a lower end portion of the shaft 16 supported in the cylindrical portion 13c of the holder 13 is inserted in the housing 11, and a plate 24 having a substantially square shape is secured at the inserted portion.

A spring 26 is interposed between the plate 24 and the holder 13, and the plate 24 is constantly rotatively urged by an urging force of this spring 26 in the direction opposite to the direction of rotation when the object to be detected is brought into contact with any of the probes 23a to 23d.

In addition, a stopper 27 is provided on a lower end surface of the holder 13 inserted into the housing 11 so as to stop the rotation of the plate 24 by abutting against one side of the plate 24 when the plate 24 is rotated by more than a predetermined amount of rotation.

As shown in FIG. 3, a movable contact 28a is provided on the plate 24 via an insulator, while a fixed contact 28b opposed to this movable contact 28a is provided inside the housing 11 via an insulator. The movable contact 28a is brought into contact with the fixed contact 28b by an urging force of the spring 26 to constitute a closed circuit, and as the movable contact 28a is brought into contact with the fixed contact 28b, the rotation of the plate 24 is stopped.

When the shaft 16 rotates as the object to be detected is brought into contact with any of the probes 23a to 23d, a trigger signal is adapted to be issued as the movable contact 28a is separated from the fixed contact 28b. This trigger signal is adapted to be output to outside the housing 11 via cords 29 each connected to the movable contact 28a and the fixed contact 28b.

The movable contact 28a and the fixed contact 28b constitute a contact 28.

A microswitch 32 is secured inside the housing 11 and below the plate 24 via a fixing member 31. A dog 33 is secured to the plate 24 and is adapted to press a lever 32a of the microswitch 32 upon rotation of the plate 24, thereby turning on the microswitch 32. When this microswitch 32 is turned on, a trigger signal similar to that of the contact 28 is issued to outside the housing 11 via other cords 29. This microswitch 32 is provided to ensure that an auxiliary trigger signal can be issued even when the object to be detected has overrun its contact position at the time when it is difficult to issue a signal due to some fault in the contact 28. For this reason, this microswitch 32 can be omitted, if necessary.

When the position of an object to be detected such as a cutting tool is detected using a touch sensor having the above-described arrangement, the housing 11 of the touch sensor is inserted into the opening 12a of the fixing member 12, and this fixing member 12 is installed on, for instance, a bed of a lathe, while the touch sensor is installed in the vicinity of, for instance, a chuck. The probes 23a to 23d provided on the rotary member 21, are aligned with the direction and in the path in which the object to be detected, such as a cutting tool, moves.

In this state, the shaft 16, the plate 24 and the like are rotatively urged in a predetermined direction by the spring 26, and the movable contact 28a provided on the plate 24 is held in contact with the fixed contact 28b.

When the cutting tool is brought into contact with any of the probes 23a to 23d, the rotational moment is provided in the rotary member 21 as the result of contact with the cutting tool. Subsequently, the plate 24 is rotated via the shaft 16 and the like in opposition to the urging force of the spring 26, the movable contact 28a is separated from the fixed contact 28b, thereby issuing a trigger signal. The contact of the object with the probe is detected since this trigger signal is output to outside the housing 11 via the cords 29.

In addition, the dog 33 secured to the plate 24 moves in conjunction with the rotation of the plate 24 and presses the lever 32a of the microswitch 32 secured below the plate 24. A trigger signal similar to the aforementioned signal is then issued by this microswitch 32, and is output to outside the housing 11 via the other cords 29.

In this embodiment, since the arrangement is such that the trigger signal is issued doubly, even if it has become difficult for, for instance, the contact 28 to issue a signal for some reason or other, the trigger signal can be issued positively. In addition, it is also possible to provide an arrangement in which an alarm is generated by this microswitch if the object has overrun its contact position.

In addition, when the rotary member 21 has rotated by more than a predetermined amount, the rotation thereof is stopped as one side of the plate 24 is brought into contact with the stopper 27.

When the object to be detected is separated from any of the probes 23a to 23d, the plate 24 is rotatively urged by the urging force of the spring 26, which in turn causes the movable contact 28a of the plate 24 to abut against the fixed contact 28b, thereby stopping any further rotation of the plate 24. In addition, the rotary member 21, provided with the probes 23a to 23d, is returned to its original position, and is set ready for an ensuing detection.

Referring now to FIGS. 5 to 8, a description will be given of a second embodiment of the present invention. Those members that are identical with those shown in the first embodiment or perform similar functions are denoted by the same reference numerals and a description thereof will be omitted.

In this embodiment, a bar 34 is provided at a lower end portion of the shaft 16 in such a manner as to be perpendicular to the shaft 16, this bar 34 is rotatively urged by the spring 26, and the stopper 27 is brought into contact with one end of the bar 34 so as to restrict the rotation of the shaft 16. In addition, another stopper 35 is provided on an underside of the holder 13 in the direction of rotation of the shaft 16, and this arrangement makes it possible to prevent the shaft 16 from overrunning by more than a predetermined angle as the bar 34 is brought into contact with the stopper 35.

Figure 8:
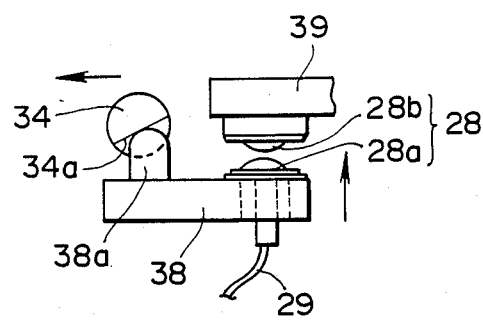
Figure 9:
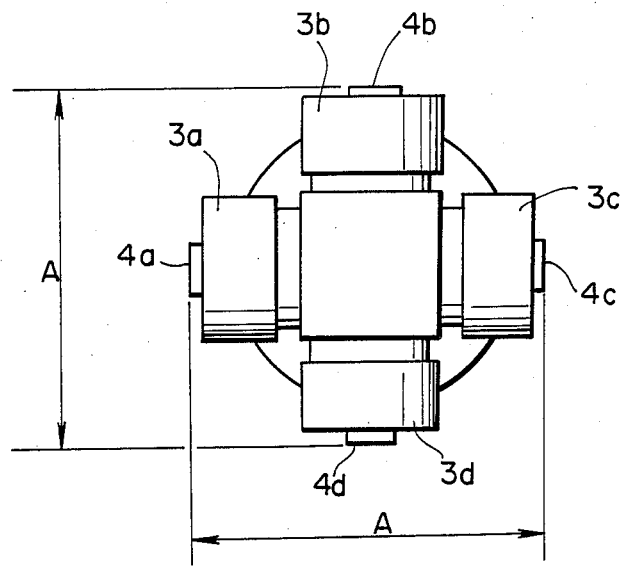
Figure 10:
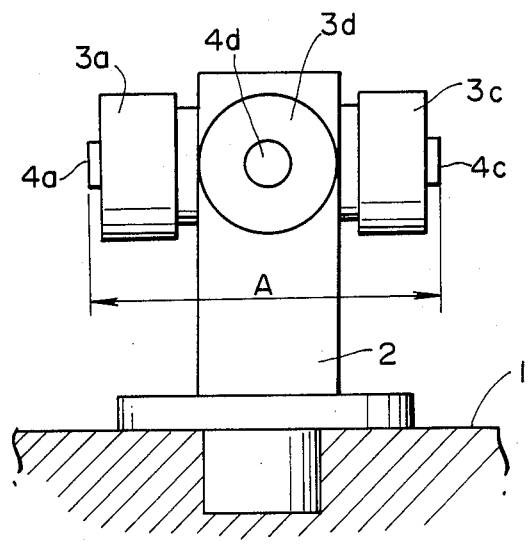

As shown in FIG. 8, a slanting notched portion 34a is formed on the side of the bar 34 opposite to the side thereof with which the stoppers 27, 35 are brought into contact.

Meanwhile, the housing 11 is provided with a fixing member 36 (FIGS. 6 and 7), and a movable plate 38 is retained by this fixing member 36 via a leaf spring 37. A projection 38a is provided on an upper surface of this movable plate 38 and is held in contact with the notched portion 34a of the bar 34. When this notched portion 34a is retreated from the projection 38a, the movable plate 38 is adapted to move vertically by a predetermined amount by an urging force of the leaf spring 37.

The movable plate 38 is provided with the movable contact 28a in such a manner as to move in conjunction with the movement of the movable plate 38. In addition, the fixed contact 28b, with which the movable contact 28a is brought into contact when the movable plate 38 is moved upwardly, is provided on the housing 11 via a fixing plate 39.

In addition, the dog 33 is secured to the lower end of the shaft 16 via a supporting member 41, and the microswitch 32 disposed below the bar 34 is adapted to be turned on by this dog 33.

In this arrangement, when the shaft 16 is rotated by the rotational moment produced by the object to be detected in opposition to the urging force of the spring 26, the bar 34 is rotated in conjunction with the rotation of the shaft 16. Subsequently, the notched portion 34a provided at one end of the bar 34 is retreated by the projection 38a of the movable plate 38, which in turn causes the movable plate 38 to move upwardly by a predetermined amount by the urging force of the leaf spring 37.

This movable plate 38 is provided with the movable contact 28a, and, when the movable plate 38 is moved, the movable contact 28a is brought into contact with the fixed contact 28b, thereby issuing a trigger signal.

In addition, as the dog 33 rotates in conjunction with the rotation of the shaft 16 and the microswitch 32 is thereby turned on, a trigger signal or an overrun alarm is issued in a similar manner.

It should be noted that, although in these embodiments an example has been described in which the configuration of the rotary member 21 is made square and the probes 23a to 23d are provided on the four sides thereof, this rotary member 21 should not be restricted to the square configuration, and another configuration such as a triangular or hexagonal configuration may also be used.

In addition, as for the probes 23a to 23d, it suffices if they are capable of rotating the shaft 16 upon contact with the object to be detected, and the configuration, position, etc. thereof are not restricted to those shown in the foregoing embodiments.

Furthermore, as many apparently widely different embodiments of this invention may be made without departing from the spirit and scope thereof, it is to be understood that the invention is not limited to the specific embodiments thereof except as defined in the appended claims.

As has been described above, according to the present invention, since the distance between the opposing ones of the probes is reduced since the contact member, etc., is located in the housing and not on the rotary member and the setup of an operation is not restricted.

Additionally, the arrangement is simple, and it is possible to prevent an increase in production costs.

What is claimed is:

1. A touch sensor comprising:
   a housing;
   a rotatable shaft projecting from one side of said housing;
   a spring means for biasing said rotatable shaft around a longitudinal axis thereof toward a first direction;
   at least one probe provided on a distal end of said shaft, said at least one probe to rotate said shaft against a biasing force of said spring means when an object to be detected is brought into contact therewith;
   a contact means disposed in said housing for issuing a trigger signal as said contact means starts to work by the rotation of said shaft, said contact means including
   a movable contact positioned within said housing and operatively moved by rotation of said shaft, and
   a fixed contact positioned in said housing and releasably contacting with said movable contact; and
   a driving means directly attached to said shaft for moving said movable contact in response to rotation of said shaft.

2. A touch sensor according to claim 1, wherein said shaft is provided with a dog fixed thereto and further comprising a microswitch positioned within said housing to issue an auxiliary trigger signal by being turned on or off by said dog by the rotation of said shaft.

3. A touch sensor according to claim 1, wherein said contact means issues a trigger signal immediately after said at least one probe is driven by contact of said object and said movable contact is moved apart from said fixed contact by said driving means.

4. A touch sensor according to claim 1, said contact means is constituted by said movable contact disposed in said housing and adapted to move vertically by the action of said driving means driven by the rotation of said shaft, and said fixed contact disposed in a face-to-face relationship with said movable contact.

* * * * *